US 8,042,177 B2

(12) United States Patent
Salgado

(10) Patent No.: US 8,042,177 B2
(45) Date of Patent: *Oct. 18, 2011

(54) METHOD AND SYSTEM FOR REQUIRING AUTHORIZATION FOR A JOB PRIOR TO PROCESSING

(75) Inventor: David L. Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/868,110

(22) Filed: Oct. 5, 2007

(65) Prior Publication Data
US 2008/0028476 A1    Jan. 31, 2008

Related U.S. Application Data

(63) Continuation of application No. 10/345,437, filed on Jan. 15, 2003, now Pat. No. 7,296,298.

(51) Int. Cl.
*G06F 21/22* (2006.01)
*G06F 21/04* (2006.01)

(52) U.S. Cl. ............................... 726/21; 726/4; 713/165

(58) Field of Classification Search .................. None
See application file for complete search history.

(56) References Cited

U.S. PATENT DOCUMENTS

| 6,498,912 B1 | 12/2002 | Leni et al. | |
| 6,583,888 B1 | 6/2003 | Salgado et al. | |
| 2003/0093670 A1* | 5/2003 | Matsubayashi et al. | 713/168 |
| 2003/0103229 A1* | 6/2003 | Weaver | 358/1.14 |
| 2003/0151762 A1* | 8/2003 | Cherry et al. | 358/1.14 |
| 2003/0151766 A1* | 8/2003 | Clough et al. | 358/1.15 |

FOREIGN PATENT DOCUMENTS

| EP | 818724 | | 1/1998 |
| EP | 818724 A1 * | | 1/1998 |

\* cited by examiner

*Primary Examiner* — Minh Dinh
*Assistant Examiner* — Venkat Perungavoor

(57) ABSTRACT

A method, computer readable medium, and for requiring external authorization for a job prior to processing includes determining for a job if external authorization for at least one is item is approved and processing the job if the determining if external authorization is approved determines that the external authorization for the at least one item is approved.

21 Claims, 3 Drawing Sheets

METHOD AND SYSTEM FOR REQUIRING AUTHORIZATION FOR A JOB PRIOR TO PROCESSING

This is a continuation application of U.S. Pat. No. 7,296,298.

FIELD

The present invention generally relates to methods and systems for authorization and, more particularly, to a method and system for requiring external authorization for a job prior to processing.

BACKGROUND

In a typical networked environment, a plurality of different types of devices, such as computer work stations, printers, facsimile machines, and copiers, are coupled together. In this environment, each of the devices is permitted to interact with the other devices. However, at times it may be desirable to control the access to one or more of the devices.

One prior system for providing this type of control required a manual input of a user identification and an account identification at a particular device before the device could be used. Although this system added a level of control and protection, it did not always provide an adequate level of security. If an unauthorized individual obtained the appropriate user identification and the account identification, this individual could gain access to using a device, even if that particular operator was not normally permitted such access.

SUMMARY OF THE INVENTION

A method and a computer readable medium having stored thereon instructions for requiring authorization for a job prior to processing in accordance with embodiments of the present invention includes determining for a job if external authorization for at least one is item is approved and processing the job if the determining if external authorization is approved determines that the external authorization for the at least one item is approved.

A system for requiring authorization for a job prior to processing in accordance with embodiments of the present invention includes an approval system and a job processing system. The approval system determines for a job at a first system if external authorization from a remote system for at least one is item is approved. The job processing system processes the job at the first system if the approval system determines that the external authorization for the at least one item is approved.

The present invention provides a more extensive and powerful authentication system and method. With the present invention, a system has better control over who uses a particular device and which operations are enabled by involving an external authorization process outside of the system. Additionally, the present invention assists in discovering and preventing misuse of the system through the authorization process and by keeping a log of activity in the system.

DETAILED DESCRIPTION

Figure 1:
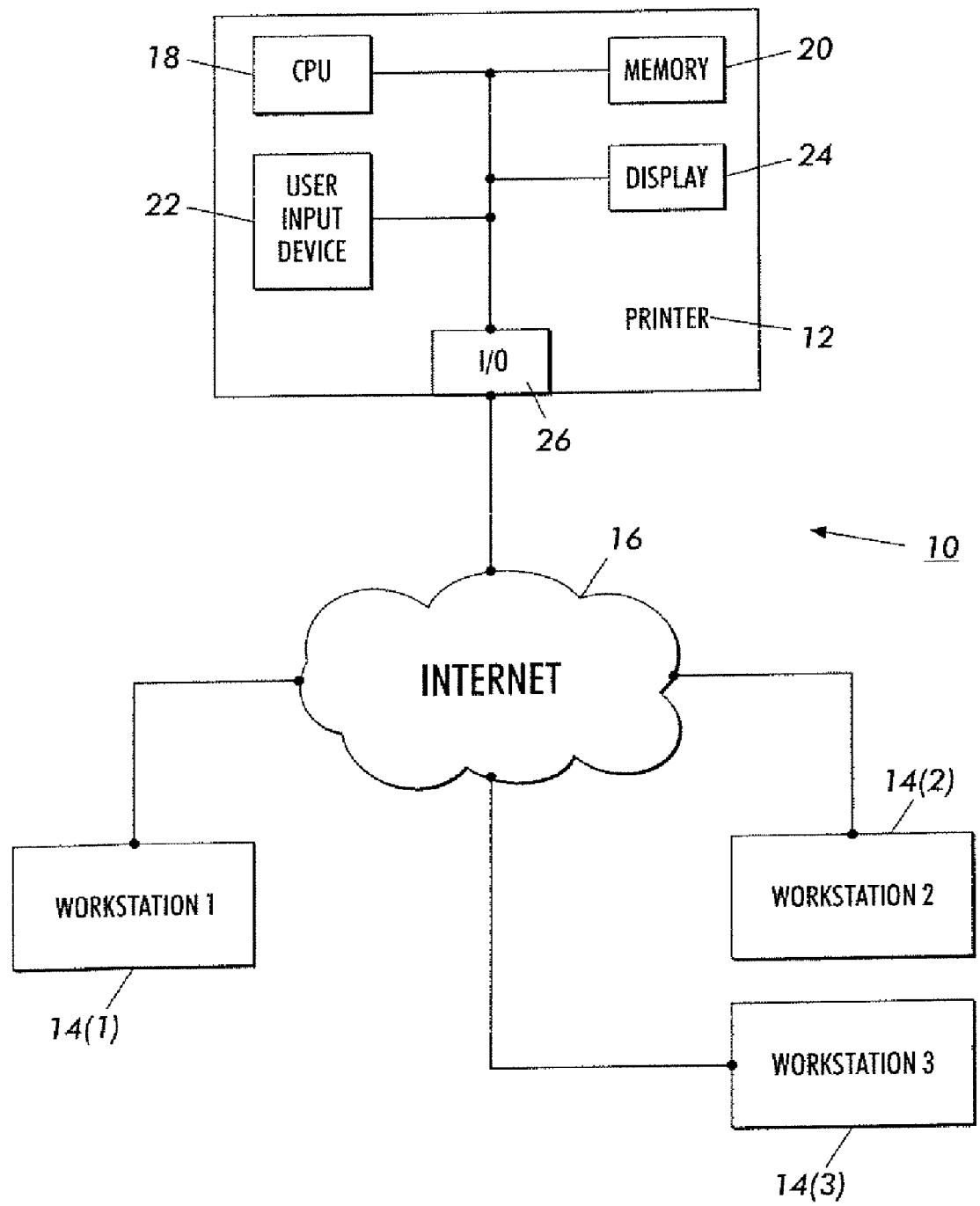
FIG. 1 is a block diagram of a system for requiring external authorization for a job prior to processing in accordance with embodiments of the present invention.

A system 10 for requiring external authorization for a job prior to processing in accordance with embodiments of the present invention is illustrated in FIG. 1. The system 10 includes a printer device 12 and workstations 14(1)-14(3) coupled together via a network 16, although the system 10 may include different kinds and numbers of components. The present invention provides a more extensive and powerful authentication system and method which requires external authorization before a job is processed.

Referring to FIG. 1, system 10 includes a printer device 12, such as printer, facsimile machine, or copier, and a plurality of computer workstations at remote locations, although system 10 can include other numbers and types of components. Each of the computer workstations has e-mail capabilities, as well as other types of functions which can be performed.

The printer device 12 includes a processor 18, a memory storage device 20, a user input device 22, a display 24, and an input/output (I/O) unit 26 which are coupled together by a bus system or other link 28, although the printer device 12 may comprise other numbers of and combinations of components.

Figure 2:
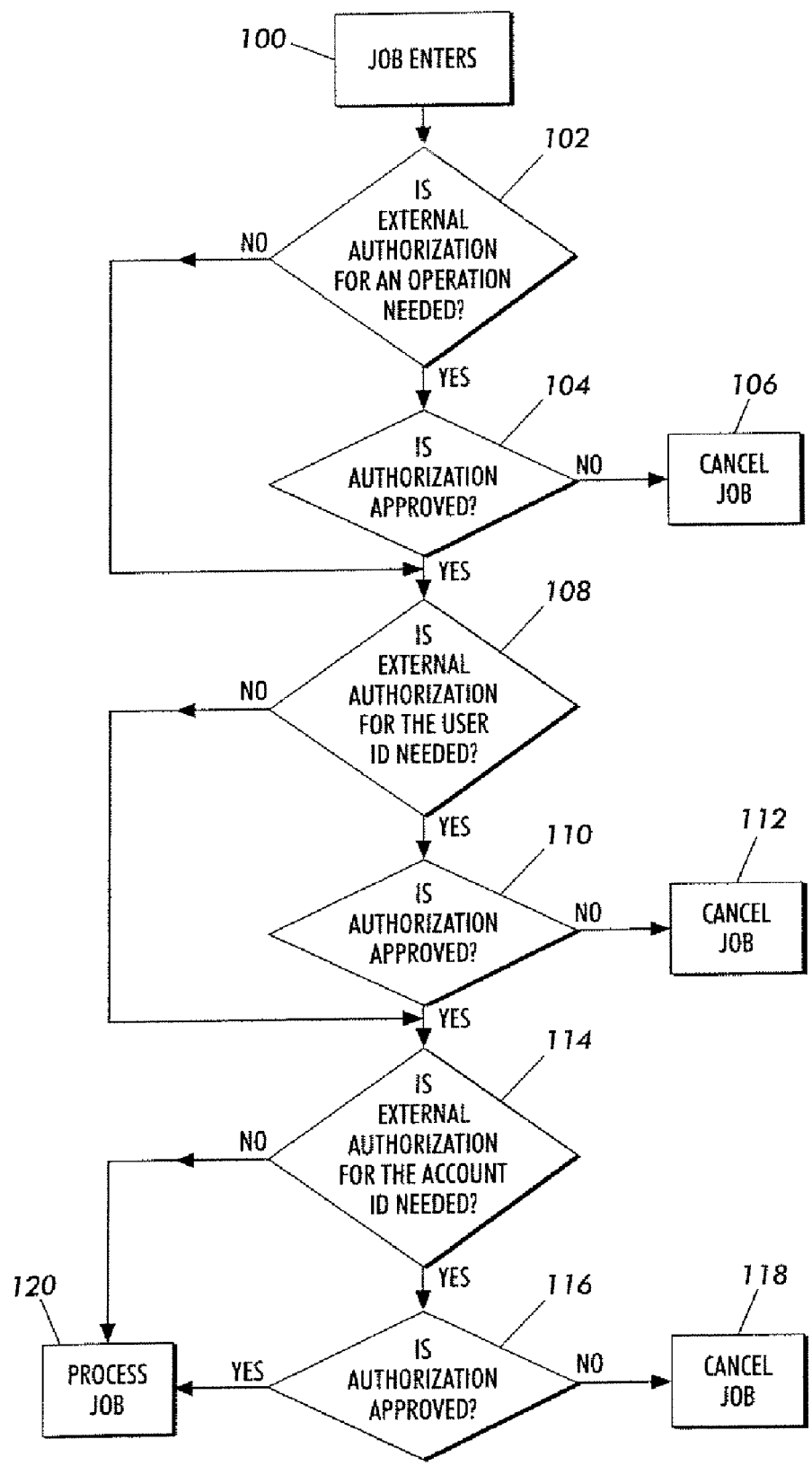
FIG. 2 is a flow chart of a method for system for requiring external authorization for a job prior to processing in accordance with embodiments of the present invention.
Figure 3:
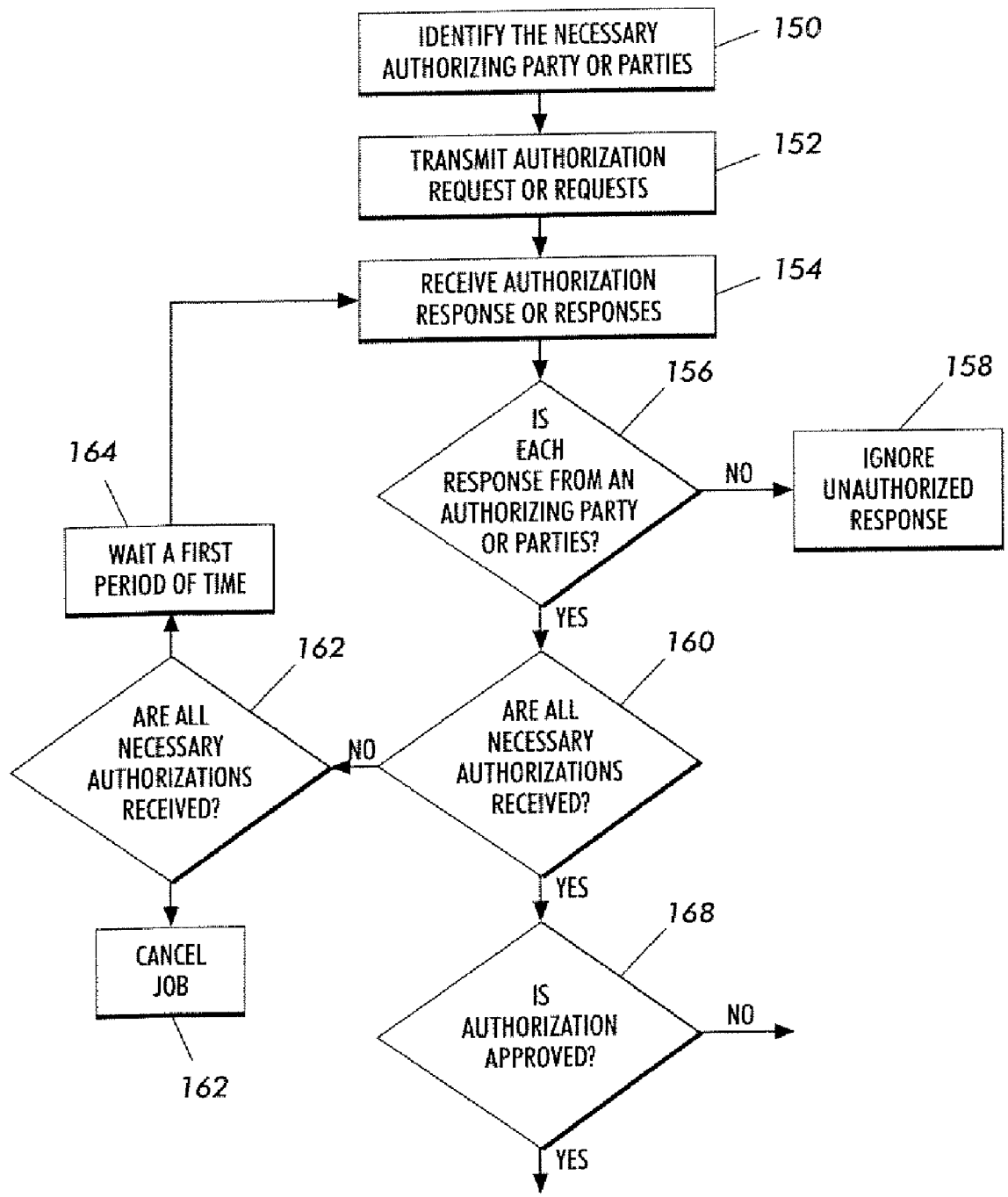
FIG. 3 is a flow chart of a method for determining if authorization is approved used in the method illustrated in FIG. 2.

The processor 18 may execute one or more programs of stored instructions for the method for requiring external authorization for a job prior to processing in accordance with one embodiment of the present invention as described herein and illustrated in FIGS. 2-3. In this particular embodiment, these programmed instructions are stored in memory and are executed by processor 18 in printer device 12, although some or all of those programmed instructions could be stored and retrieved from and also executed at other locations, such as in one or more of the computer work stations 14(1)-14(3). A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor 18, can be used for memory.

The user input device 22 permits an operator to enter data into the in printer device 12, such as parameters relating to the tables for external authorization or the first waiting period of time for responses. A variety of different types devices can be used for user input device 22, such as a keyboard, a computer mouse, or an interactive display screen.

The display or graphical user interface 24 is used to show information to the operator, such as the status of the authorization of items for the job. A variety of different of devices can be used for the display 24, such as a CRT or flat panel display.

The I/O unit 26 is used to couple the printing device to computer work stations 14(1)-14(3), although I/O unit 26 can be used to couple the printer device 12 to other components. A variety of different I/O devices can be used with a variety of different communication protocols.

The network 16 is the Internet, although other types of networks can be used, such as an a local area network, a wide area network, a telephone line network, a coaxial cable network, and a wireless networks can be used. The network 16 enables printer device 12 and computer work stations 14(1)-14(3) to communicate with each other.

The operation of the system 10 for requiring external authorization for a job prior to processing in accordance with embodiments of the present invention will now be described with reference to FIGS. 1-3. Referring more specifically to FIG. 2, the operation starts at step 100 where a job, such as a print job, is entered or otherwise obtained at print device. The printer device 12 puts the job on hold pending a determination about external authorization.

In step 102, the printer device 12 determines if external authorization for an operation or operations, such as printing or faxing, in the job is needed. External authorization means the printer device 12 must receive an additional approval(s) external from the printer device 12 before the job can be processed. The printer device 12 has a table stored in memory which specifies operations which require external authorization. Authorization for an operation means obtaining authorization for a functional operation of a device, such as printing or copying. Authorization for a user identification means obtaining authorization for a particular individual who wants to use the device for the job. Authorization for an account identification means authorization for a specified account for the job, such as for a billing account to keep track of charges for the job. If external authorization for the operation in the job is not needed, then the No branch is taken to step 108, although other arrangements can be used, such as permitting the processing of the job to take place. If external authorization for the operation for the job is needed, then the Yes branch is taken to step 104.

In step 104, the printer device 12 determines if authorization for the operation for the job is approved as explained in greater detail below with reference to FIG. 3. If authorization is not approved, then the No branch is taken to step 106 where the job is cancelled and the owner or originator of the job is notified of the cancellation. If authorization is approved, then the Yes branch is taken to step 108, although other arrangements can be used, such as permitting the processing of the job to take place. The printer device 12 logs approval or rejection of the job in a log stored in memory.

In step 108, the printer device 12 determines if external authorization for a user identification is needed. The printer device 12 has a table stored in memory which specifies user identifications which require external authorization. If external authorization for the user identification for the job is not needed, then the No branch is taken to step 114, although other arrangements can be used, such as permitting the processing of the job to take place. If external authorization for the user identification for the job is needed, then the Yes branch is taken to step 110.

In step 110, the printer device 12 determines if authorization for the user identification is approved as explained in greater detail below with reference to FIG. 3. If authorization is not approved, then the No branch is taken to step 112 where the job is cancelled and the owner or originator of the job is notified of the cancellation. If authorization is approved, then the Yes branch is taken to step 114, although other arrangements can be used, such as permitting the processing of the job to take place. The printer device 12 logs approval or rejection of the job in a log stored in memory.

In step 114, the printer device 12 determines if external authorization for an account identification for the job is needed as explained in greater detail below with reference to FIG. 3. The printer device 12 has a table stored in memory which specifies account identifications which require external authorization. If external authorization for the operation for the job is not needed, then the No branch is taken to step 120 where the job is processed, although other arrangements can be used. If external authorization for the account identification for the job is needed, then the Yes branch is taken to step 116.

In step 116, the printer device 12 determines if authorization for the account identification is approved. If authorization is not approved, then the No branch is taken to step 118 where the job is cancelled and the owner or originator of the job is notified of the cancellation. If authorization is approved, then the Yes branch is taken to step 120 where the job is processed, although other arrangements can be used. The printer device 12 logs approval or rejection of the job in a log stored in memory.

Although three different types of external authorizations are disclosed, other types and combinations of external authorizations can be used in printer device 12. For example, the printer device 12 may simply require approval of authorization for just one of the operation in the job, the user identification, or the account identification or some other combination of these or other items. Additionally, approval of the external authorization may be needed from just one authorizing party, two or more authorizing parties in a set of authorizing parties that were requested to give approval, or from all authorizing parties which were notified. Further, although the present invention is being executed in the printer device 12, the present invention can be executed in other systems, such as in one or more of the computer work stations 14(1)-14(3).

Referring to FIG. 3, the process for determining if external authorization is approved in steps 104, 110, and 116 is described in greater detail. For each item, e.g. an operation, user identification, or account identification, requiring external authorization, a table stored in memory specifies the number of external authorizations required and the authorizing party or parties and their e-mail address at their work station or stations that can authorize the job. In step 150, the printer device 12 identifies the necessary authorizing party or parties at one or more computer work stations 14(1)-14(3) needed for the approval of the external authorization.

In step 152, the request or requests for authorization are transmitted to the identified necessary authorizing party or parties at one or more computer work stations 14(1)-14(3). The request or requests are sent via e-mail using the Internet to the authorizing party or parties, although other types of communication systems and other types of networks can be used. Each of the authorizing party or parties reviews and determines whether to approve or reject the request for authorization.

In step 154, one or more responses to the request or requests for authorization are received by the printer device 12 from the authorizing party or parties at the computer work stations 14(1)-14(3).

In step 156, the printer device 12 determines if each of the responses is from one of the authorizing party or parties. If a response is not from one of the authorizing parties which was originally identified and sent a request for authorization, then in step 158 the printer device 12 ignores the unauthorized response.

In step 160, the printer device 12 determines if the necessary number of responses to the requests for external authorization are received. The printer device 12 can be configured to require a particular minimum number of responses to the requests which were sent out. For example, the printer device 12 can be configured to require just one response to one or more requests or at least three responses to five requests for external authorization to be received. If the necessary number of responses to the requests for external authorization are received, then the Yes branch is taken to step 168. If the necessary number of responses to the requests for external authorization are not received, then the Yes branch is taken to step 162.

In step 162, the printer device 12 determines if a first waiting period of time for receiving responses has expired. The time for the first waiting period can be set as desired for the particular application in the printer device 12. If the first waiting period of time has not expired, then the No branch is taken to step 154 where an additional response or responses may be received. In step 156, the printer device 12 will check if each of the new responses is from an authorizing party as described earlier. In step 160, the printer device 12 determines if the necessary response or responses to the request or requests for external authorization are received as described earlier. If the first waiting period of time has expired, then the Yes branch is taken to step 166 where the job is cancelled.

In step 168, the printer device 12 determines if based on the response or responses to the requests if external authorization is approved. The number of responses needed to approve authorization can be set in the printer device 12 as needed for the particular application. For example, the printer device 12 may simply require one response which approves the request for authorization or may need four responses which approves the request for authorization. If authorization is not approved, then the No branch is taken to step 106, 112, or 118 in FIG. 2 where the job is cancelled. If authorization is approved, then the Yes branch is taken to step 108, 114, or 120 in FIG. 2 as described earlier.

Accordingly, with the present invention a system has better control over who uses a particular device and which operations are enabled by involving an external authorization process outside of the system. Additionally, the present invention assists in discovering and preventing misuse of the system through the authorization process and by keeping a log of activity in the system. This log can be reviewed by an operator to identify potential misuse of devices within the system.

While particular embodiments have been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. A method comprising:
   determining for a job with an enabled authorization system in a printer device if external authorization for at least one item is needed;
   identifying for the job at the printer device at least one authorizing party which can provide external authorization for the at least one item;
   transmitting from the printer device at least one request for approval of the external authorization to the identified at least one authorizing party;
   determining for the job at the printer device if the external authorization for at least one item determined to be needed is approved by the identified at least one authorizing party; and
   processing the job at the printer device if one of the determining if external authorization is approved determines that the external authorization for the at least one item determined to be needed is approved and the determining for the job with the enabled authorization system determines external authorization is unnecessary for the items
   wherein for each item requiring external authorization a table stored at the printer device specifies the number of external authorizations required, the authorizing party or parties and their email addresses is used.

2. The method as set forth in claim 1 wherein the identifying for a job at least one authorizing party further comprises identifying the plurality of authorizing parties for the at least one item, wherein the transmitting further comprises transmitting a plurality of requests to the plurality of identified authorizing parties.

3. The method as set forth in claim 1 further comprising canceling the job if the determining if external authorization is approved determines that the external authorization for the at least one item is not approved.

4. The method as set forth in claim 1 wherein the determining for a job if external authorization for at least one is item is approved further comprises:
   determining for a job if external authorization for at least one operation in the job is approved;
   determining for a job if external authorization for at least one user identification for the job is approved; and
   determining for a job if external authorization for at least one account identification is approved.

5. The method as set forth in claim 4 wherein the processing the job further comprises processing the job if the determining if external authorization is approved determines that external authorization is approved for the operation, the user identification and the account identification.

6. The method as set forth in claim 1 wherein the determining if external authorization is approved further comprises:
   determining if a first necessary number of the at least one response have been received from the identified at least one authorizing party; and
   waiting a first period of time if the first necessary number of the at least one responses have not yet been received, wherein the job is cancelled if the first period of time expires and the first necessary number had not been reached.

7. A non-transitory computer readable medium having stored thereon instructions for requiring external authorization for a job prior to processing which when executed by a processor, causes the processor to perform the steps of:
   determining for the job with an enabled authorization system if external authorization for at least one item is needed;
   identifying for a job at least one authorizing party which can provide external authorization for the at least one item determined to be needed;
   transmitting at least one request for approval of the external authorization to the identified at least one authorizing party;
   determining for the job if the external authorization for the at least one item determined to be needed is approved by the identified at least one authorizing party; and
   processing the job if one of the determining if external authorization is approved determines that the external authorization for the at least one item determined to be needed is approved and the determining for the job with the enabled authorization system determines external authorization is unnecessary for the item;
   wherein for each item requiring external authorization a table stored at the printer device specifies the number of external authorizations required, the authorizing party or parties and their email addresses is used.

8. The medium as set forth in claim 7 wherein the identifying for a job at least one authorizing party further comprises identifying the plurality of authorizing parties for the at least one item, wherein the transmitting transmits a plurality of requests to the plurality of identified authorizing parties.

9. The medium as set forth in claim 7 further comprising canceling the job if the determining if external authorization is approved determines that the external authorization for the at least one item is not approved.

10. The medium as set forth in claim 7 wherein the determining for a job if external authorization for at least one is item is approved further comprises:
   determining for a job if external authorization for at least one operation in the job is approved;
   determining for a job if external authorization for at least one user identification for the job is approved; and
   determining for a job if external authorization for at least one account identification is approved.

11. The medium as set forth in claim 10 wherein the processing the job further comprises processing the job if the determining if external authorization is approved determines that external authorization is approved for the operation, the user identification and the account identification.

12. The medium as set forth in claim 7 wherein the determining if external authorization is approved further comprises:
   determining if a first necessary number of the at least one response have been received from the identified at least one authorizing party; and
   waiting a first period of time if the first necessary number of the at least one responses have not yet been received, wherein the job is cancelled if the first period of time expires and the first necessary number had not been reached.

13. A system comprising:
   a processor;
   a memory having software instructions which, when executed by the processor, executes the method comprising:
   determining for a job with an enabled authorization system in a printer device if external authorization for at least one item is needed;
   identifying for the job at the printer device at least one authorizing party which can provide external authorization for the at least one item;
   transmitting from the printer device at least one request for approval of the external authorization to the identified at least one authorizing party;
   determining for the job at the printer device if the external authorization for at least one item determined to be needed is approved by the identified at least one authorizing party; and
   processing the job at the printer device if one of the determining if external authorization is approved determines that the external authorization for the at least one item determined to be needed is approved and the determining for the job with the enabled authorization system determines external authorization is unnecessary for the items
   wherein for each item requiring external authorization a table stored at the printer device specifies the number of external authorizations required, the authorizing party or parties and their email addresses is used.

14. The system as set forth in claim 13 wherein the identification system identifies for a job at least one authorizing party further comprises an identification system that identifies a plurality of authorizing parties for the at least one item, wherein the communication system transmits the plurality of requests to the plurality of identified authorizing parties.

15. The system as set forth in claim 13 further comprising a job cancellation system that cancels the job if the approval system determines that the external authorization for the at least one item is not approved.

16. The system as set forth in claim 13 wherein the approval system determines for a job if external authorization for at least one operation in the job is approved, if external authorization for at least one user identification for the job is approved, and if external authorization for at least one account identification is approved.

17. The system as set forth in claim 16 wherein the job processing system processes the job if the approval system determines that external authorization is approved for the operation, the user identification and the account identification.

18. The system as set forth in claim 13 wherein the approval system further comprises:
   a count processing system that determines if a first necessary number of the at least one response have been received from the identified at least one authorizing party at the remote system; and
   a timing system that waits a first period of time if the first necessary number of the at least one responses have not yet been received, wherein the job is cancelled if the first period of time expires and the first necessary number had not been reached.

19. The method as set forth in claim 1 wherein the determining further comprises determining if responses received for the plurality of requests approve the external authorization, wherein at least two or more of the responses must approve the external authorization for the approval to be granted.

20. The medium as set forth in claim 7 wherein the determining further comprises determining if responses received for the plurality of requests approve the external authorization, wherein at least two or more of the responses must approve the external authorization for the approval to be granted.

21. The system as set forth in claim 13 wherein the approval system determines if responses received for the plurality of requests approve the external authorization, wherein at least two or more of the responses must approve the external authorization for the approval to be granted.

* * * * *